Aug. 20, 1957 S. V. HUTCHINSON 2,803,363
ROLL HANDLING ATTACHMENT FOR INDUSTRIAL LIFT TRUCKS
Filed March 7, 1955
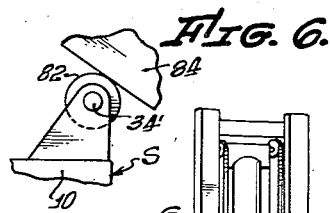
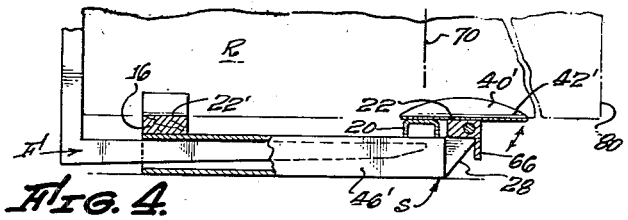
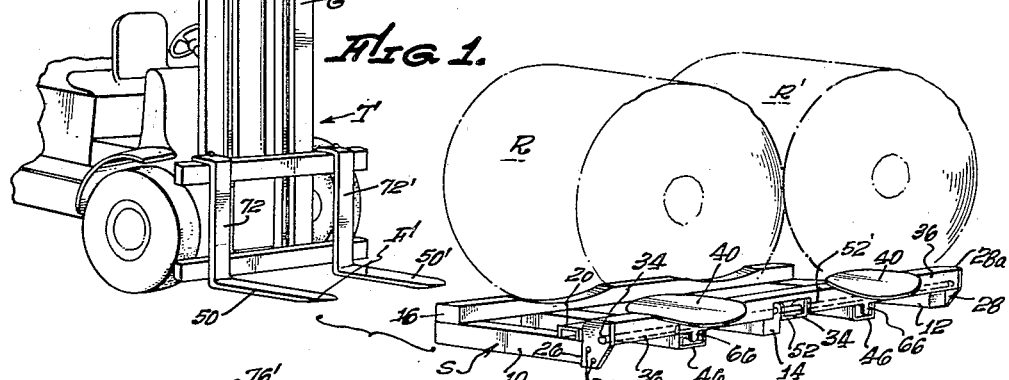
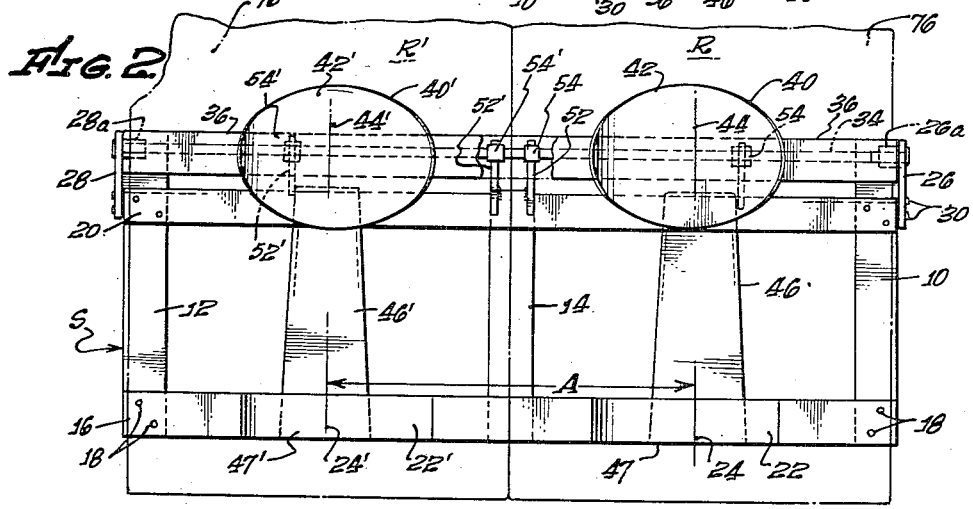
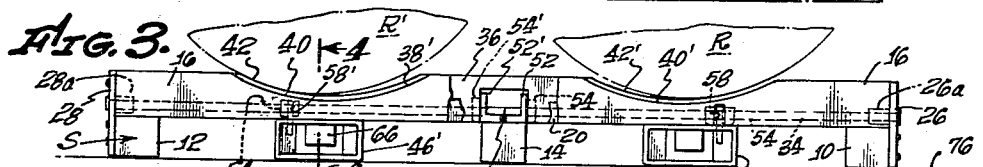
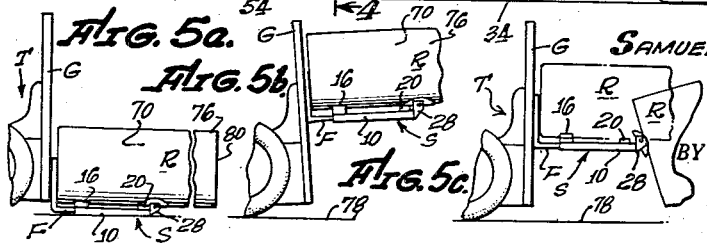
Samuel V. Hutchinson,
INVENTOR.
BY William C. Babcock
ATTORNEY.

United States Patent Office 2,803,363
Patented Aug. 20, 1957

2,803,363

ROLL HANDLING ATTACHMENT FOR INDUSTRIAL LIFT TRUCKS

Samuel V. Hutchinson, Wilmington, Calif.

Application March 7, 1955, Serial No. 492,479

7 Claims. (Cl. 214—621)

The present invention relates generally to the field of material handling devices, and more particularly to an apparatus and method of using same in moving heavy, bulky articles such as rolls of newsprint, bales of hemp, or the like.

While most commodities that are packaged in rolls or bales for freight shipment are cumbersome to handle, heavy rolls of newsprint paper and baled hemp present more difficult materials handling problems than most in that they are normally shipped by water and frequently become damaged during loading and unloading at the points of departure and arrival, as well as when it is transported to and from the respective loading docks from and to a storage location therefor. Newsprint rolls very often are damaged by the power gripping means employed in lifting and moving same from place to place, which damage is sufficiently severe at times to require cutting away or trimming of portions thereof before a roll can be used on a printing press. Even when these rolls are not physically cut or defaced in such handling, they sometimes are laterally compressed and assume a lop-sided configuration which makes for an unbalanced rotation thereof when disposed on a printing press.

The major object of the present invention is to provide an apparatus and method of using same in the handling of heavy rolls of newsprint paper and heavy baled commodities by means of which this goods may be moved from place to place with a minimum of physical labor in such a manner as to eliminate substantially all of the operational disadvantages of previously available materials handling equipment and methods.

Another object of the invention is to supply an apparatus and method of using same that virtually eliminates the possibility of injury to freight handling personnel in moving heavy packages, rolls and boxes, as well as in stacking same.

A further object of the invention is to furnish an apparatus and method of using same that requires a minimum purchase of new equipment upon its adoption, with the structure of such new equipment permitting fabrication thereof from standard commercially available materials at a relatively low cost.

Yet another object of the invention is to furnish an apparatus and method of using same which substantially reduces the time required in heavy materials handling.

These and other objects and advantages of the present invention will become apparent from the following description of a preferred form thereof, and from the accompanying drawing in which:

Figure 1 is a perspective view of a power-operated lift truck and apparatus for use in conjunction therewith;

Figure 2 is a plan view of the movable support for rolls of newsprint paper;

Figure 3 is an end elevational view of said support;

Figure 4 is a vertical cross-sectional view of the support shown in Figure 3 taken on line 4—4 thereof;

Figure 5a is a diagrammatic view of the support and a truck showing rolls of paper mounted on the support before they have been lifted from the floor;

Figure 5b is a diagrammatic view of the truck and loaded support after the support has been raised to the desired elevation, showing the support in a rearwardly tilted position to prevent displacement of load therefrom;

Figure 5c is a diagrammatic view of the truck and support, showing the support tilted forwardly and downwardly to cause the load to slide forwardly therefrom in an up-ended position; and Figure 6 is a fragmentary side elevational view of that forward portion of the support particularly adapted for use in transporting baled goods.

Referring now to the drawing, it will be seen that a power-actuated truck T is provided that has a forwardly projecting fork F adapted to be raised to a desired elevation. In addition to being vertically adjustable, the fork F must also be capable of being tilted rearwardly or forwardly at will relative to the vertical guides G shown in Figure 1. Truck T, fork F, and guides G are commercially available, and no claim to patent protection thereon is sought herein.

The structural details of the present invention may best be seen in Figures 1 to 3, and it will be particularly noted that this handling device is adapted to support two rolls R and R' of newsprint paper thereon. The support, generally denoted by the letter S, includes two heavy, parallel side pieces 10 and 12 between which a third rigid member 14 is intermediately positioned and parallel thereto. Side pieces 10 and 12, and member 14 are of substantially the same length and transverse cross section. A first cross piece 16 rests on the upper rearward surfaces of side pieces 10 and 12 and member 14, which cross piece is held in this position by means of a plurality of bolts 18 or other suitable fastening means. A second cross piece 20 is provided (Figure 2) that rests across the upper forward surfaces of side pieces 10 and 12 and member 14. These first and second cross pieces serve to maintain side pieces 10 and 12 and member 14 together as an integral rectangular unit.

Cross piece 16 (Figure 4) is preferably rectangular in transverse cross section, and sufficiently thick that two arcuate laterally separated recesses or grooves 22 and 22' may be formed in the upper surface thereof. The radius of curvature of grooves 22, 22' is the same as that of the largest rolls R to be handled by the invention. The centers 24 and 24' of the grooves must be separated by a distance A (Figure 2) that is at least twice the radius of the largest rolls R, for should this distance be any less, the sides of the rolls would contact one another, which contact could not only cause frictional damage thereto, but in addition, the rolls would not be held in a stable position.

Two heavy, rigid plates 26 and 28 are secured in vertical position to the forward end portions of side pieces 10 and 12 respectively, by bolts 30 or other fastening means. Portions of plates 26 and 28 extend above side pieces 10 and 12, and bearings 26a and 28a are mounted on these upwardly extending portions, which bearings support the end portions of a heavy transversely disposed shaft 34. Shaft 34 extends longitudinally through a second cross piece 36 of rectangular transverse cross section, in which a pair of spaced recesses 38 and 38' are formed in the upper portion thereof. Recesses 38, 38' are of the same shape but slightly larger than recesses 22, 22' and are in longitudinal alignment with centers 24, 24' of the latter recesses.

Two oval cradles 40 and 40' fabricated from heavy metal plate are provided, the upper surfaces 42 and 42' of which are concavely curved transversely of the major axes 44 and 44' of the cradles. The radius of curvature of upper surfaces 42, 42' is the same as that of recesses 22, 22'.

In Figures 1, 2 and 3 it will be seen that two open-ended, forwardly extending, tapered housings 46 and 46' are laterally spaced and rigidly affixed to the lower surfaces of first and second cross pieces 16 and 20. The lateral spacing of housings 46, 46' is such as to permit slidable engagement thereof by two forwardly extending rigid members 50, 50' forming a part of the fork F. Housings 46, 46' terminate at their forward ends at the second cross piece 20 from which two brackets 52 and 52' project forwardly. Semi-cylindrical bearings 54 and 54' are supported on the forward extremities of brackets 52, 52', which bearings rotatably engage shaft 34 when disposed in slots 58 and 58' formed in the under portion of second cross piece 20.

A counterweight 66 (Figure 4) depends downwardly from the second cross piece 36 and maintains the cradles 40, 40' in horizontal position when rolls R, R' are not partially supported by the cradles. It will be obvious that when rolls R, R' are partially supported on cradles 40, 40', the weight of the rolls maintains the cradles in substantially horizontal position.

The use and operation of the invention is extremely simple. When it is desired to move two rolls of paper R, R', they are placed on the invention when it is disposed as shown in Figure 5a to rest in recesses 22, 22' and cradles 40, 40'. Rolls R, R' are then adjusted longitudinally relative to the invention so that the center of gravity 70 thereof will be to the rear a few inches of the centerline of shaft 34. If not already disposed in housings 46, 46', the rigid members 50, 50' forming fork F of truck T is inserted therein through the open end portions 47, 47' of greatest width. The tapered structure of housings 46, 46' automatically centers the invention on fork F when the housings are fully engaged thereby.

Thereafter guides G are caused to tilt rearwardly at an angle of from 5° to 10° by proper manipulation of controls (not shown) associated with the power-operated truck, which tilting movement is immediately reflected in the position of fork F, the invention, and the rolls R, R' mounted thereon. Fork F is then raised on guides G to the position shown in Figure 5a. It will be apparent that in the tilted elevated position, the center of gravity 70 of each roll R, R' will move rearwardly in a horizontal plane a few inches closer to the truck T. Any inadvertent rearward movement of rolls R, R' toward truck T when in an elevated tilted position is prevented due to the fact that the rolls abut against the forward faces of uprights 72 and 72' forming a part of the fork members 50, 50'.

Rolls R, R' are transported on fork F at a rearwardly tilted angle B relative to the horizontal (Figure 5b) to the desired location, at which time the fork F is lowered and also returned to a horizontal position. The rate of return of the fork F to the horizontal position must be such that sufficient momentum is imparted to the portions 76, 76' of rolls R, R' projecting forwardly beyond the longitudinal axis of shaft 34, that this force together with the weight of roll portions 76, 76', the rolls will be caused to pivot forwardly and downwardly on cradles 40, 40' as shown in Figure 5c. The momentum developed in this forward movement of rolls R, R' will also carry them forwardly after edge portions thereof contact the floor surface 78. This forward pivotal movement of rolls R, R' terminates when they come to rest in upright position supported on their ends 80. The above handling operation may be continued until all of the rolls R, R' have been moved to the desired location.

It will be noted in the structure of the invention that the two cradles 40, 40' must pivot in unison, whereby the rolls R, R' are discharged in unison therefrom. This particular concept has a very practical advantage in that one of the rolls R or R' will not be discharged from the device before the other, due to the particular positioning there in the cradles. Although it will be apparent that cradles 40, 40' can be pivotally supported to move independently of one another, the unitary movement of the cradles is desired, as it prevents truck imbalance should one of the rolls remain in position thereon after the other roll has been discharged therefrom.

The invention is by no means limited to the handling of heavy rolls of paper, but may be similarly used to transfer bales of hemp and like objects from place to place. When the invention is employed to move rolls of hemp 84 that are flat-sided, for example, the cradles 40, 40' and recesses 22, 22' have no utility. Accordingly, the shaft 34 is then replaced by a shaft 34' on which a number of longitudinally spaced rolls 82 are mounted (Figure 6). The external diameter of rolls 82 is such that the upper surfaces of the rolls are at the same elevation as the upper surface of cross piece 16' in which no recesses are formed. The bales of hemp 84 are then supported on the upper surfaces of cross piece 16 and rolls 82.

Although the invention herein shown and described is fully capable of achieving the objects and providing the advantages herein mentioned, it is to be understood that it is merely the presently preferred form thereof, and that I do not mean to be limited to the details of construction herein shown and described other than as defined in the appended claims.

The invention claimed is:

1. A material handling device for use in conjunction with a lift truck having a fork which can be moved vertically, forwardly and rearwardly, including: a substantially rectangular rigid frame embodying a rearwardly disposed cross piece; means provided on said frame that can be slidably engaged by said fork when said frame is resting on the ground surface; a roller transversely disposed on the forward portion of said frame; and rotatable means for pivotally supporting said roller from said frame, which roller and said rearwardly disposed cross piece cooperate to so support a plurality of elongate bodies therebetween that forward portions thereof project beyond said frame to permit discharge of said bodies from said frame when it is tilted forwardly and downwardly from a rearwardly and upwardly tilted position to a horizontal position at such a rate that the weight of said projecting body portions with the momentum said portions acquire during said movement being sufficient to permit said bodies to pivot forwardly and downwardly on said cradles to positions where said bodies may slide therefrom.

2. A materials handling device for use in conjunction with a lift truck having a fork which can be moved vertically, forwardly and tilted forwardly and rearwardly, including: a substantially rectangular rigid frame embodying a first rearwardly disposed cross piece; a plurality of transversely spaced, longitudinally extending housings open at the rearward ends thereof, said housing being rigidly affixed to said frame, with the interior cross section of each of said housings being such that they can be slidably engaged and supported by said fork; a shaft transversely disposed on the forward portion of said frame; a second transversely disposed cross piece that is pivotally supported by said shaft; and a plurality of transversely spaced cradles mounted on said second cross piece, which cradles and said first cross piece cooperate to so removably support a plurality of elongate bodies therebetween that forward portions of said bodies project beyond said frame to permit discharge of said bodies from said frame when it is tilted forwardly and downwardly from an upwardly tilted position at such a rate that the weight of said projecting body portions, together with the momentum said portions acquire during said movement results in the forward and downward pivoting of said bodies on said cradles to positions where said bodies slide therefrom.

3. A materials handling device as defined in claim 2 in which said materials are rolls of newsprint paper, and in which said first cross piece is formed with transversely spaced arcuate recesses, the radius of curvature of which are substantially that of the largest of said rolls to be handled, with said cradles having transversely concave upper surfaces that are in longitudinal alignment with the surfaces of said recesses.

4. A materials handling device as defined in claim 2 in which counter weights are provided that depend downwardly from said second cross piece to maintain said cradles in horizontal positions when said rolls are not disposed thereon.

5. A materials handling device as defined in claim 2 in which bearings are mounted on the forward portion of said frame that pivotally support said shaft.

6. A device for handling heavy elongate bodies, including: a substantially rectangular frame; means for vertically moving said frame and tilting said frame forwardly and rearwardly; and a transversely concave cradle pivotally supported from said frame that is in longitudinal alignment with a rearwardly disposed transversely concave surface defined by said frame, which cradle is adapted to movably and freely engage the under surface of said body forwardly from its center of gravity when said body is in a rearwardly and downwardly extending position and at least a portion thereof rearwardly of said center of gravity is supported on said concave frame surface, with said cradle pivoting and permitting said body to move forwardly relative thereto to be discharged from said frame when said frame is moved to a forwardly and downwardly extending position.

7. A device for handling heavy elongate bodies, including: a substantially rectangular frame; means for vertically moving said frame and tilting said frame forwardly and rearwardly, and a transversely supported roller rotatably mounted on the forward portion of said frame that is in longitudinal alignment with a rearwardly disposed transversely concave surface defined by said frame, which cradle is adapted to movably and freely engage the under surface of said body forwardly from its center of gravity when said body is in a rearwardly and downwardly extending position and at least a portion thereof rearwardly of said center of gravity is supported on said concave frame surface, with said roller rotating and permitting said body to move forwardly relative thereto to be discharged from said frame when said frame is moved to a forwardly and downwardly extending position.

References Cited in the file of this patent

UNITED STATES PATENTS

| | | |
|---|---|---|
| 2,304,649 | McDaniels | Dec. 8, 1942 |
| 2,482,692 | Quales et al. | Sept. 20, 1949 |
| 2,575,552 | Glenn | Nov. 20, 1951 |
| 2,662,710 | Lapham | Dec. 15, 1953 |

FOREIGN PATENTS

| | | |
|---|---|---|
| 659,005 | Great Britain | Oct. 17, 1951 |